(12) United States Patent
Wollin et al.

(10) Patent No.: US 12,160,109 B2
(45) Date of Patent: *Dec. 3, 2024

(54) REMOTELY CONTROLLED ELECTRICAL POWER GENERATING SYSTEM

(71) Applicant: BWR Innovations LLC, Fargo, ND (US)

(72) Inventors: Thomas J. Wollin, Vergas, MN (US); Adam C. Jorgenson, West Fargo, ND (US); Joel A. Jorgenson, Fargo, ND (US)

(73) Assignee: BWR Innovations LLC, Fargo, ND (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/353,518

(22) Filed: Jul. 17, 2023

(65) Prior Publication Data

US 2023/0361575 A1 Nov. 9, 2023

Related U.S. Application Data

(63) Continuation of application No. 17/564,563, filed on Dec. 29, 2021, now Pat. No. 11,710,970, which is a
(Continued)

(51) Int. Cl.
*H02J 3/38* (2006.01)
*H01M 8/04537* (2016.01)
(Continued)

(52) U.S. Cl.
CPC ......... *H02J 3/381* (2013.01); *H01M 8/04567* (2013.01); *H01M 8/04888* (2013.01);
(Continued)

(58) Field of Classification Search
CPC ........ H02J 3/38; H02J 3/381; H02J 13/00006; H02J 13/00002; H02J 7/0068; H02J 2300/30; H01M 8/04567; H01M 8/04888
See application file for complete search history.

(56) References Cited

U.S. PATENT DOCUMENTS

| | | |
|---|---|---|
| 3,784,896 A | 1/1974 | Lakota |
| 4,905,134 A | 2/1990 | Recker |

(Continued)

FOREIGN PATENT DOCUMENTS

WO 02066974 A2 8/2002

OTHER PUBLICATIONS

PCT International Search Report and Written Opinion for PCT/US2020/015545; Received on Apr. 28, 2020.
(Continued)

*Primary Examiner* — Robert L Deberadinis
(74) *Attorney, Agent, or Firm* — Neustel Law Offices

(57) ABSTRACT

An externally-controllable electrical power generating system for providing auxiliary or backup power to a load bus or device. The system may be used indoors, and generally includes a power source comprising a first DC output, an electrical storage unit comprising a DC input coupled to the first DC output of the power source, the electrical storage unit further comprising a second DC output. An inverter coupled to the second DC output receives power, the inverter having a first AC output that can be synchronized with an AC load bus or AC grid. The system includes a contactor connected between the first AC output and an AC load bus, and is controllable with an external controller operated by a utility or a managing entity, such that the external controller can enable the controller to connect or disconnect the contactor.

20 Claims, 14 Drawing Sheets

Related U.S. Application Data continuation-in-part of application No. 17/325,713, filed on May 20, 2021, now Pat. No. 11,398,733, which is a continuation of application No. 16/745,448, filed on Jan. 17, 2020, now Pat. No. 11,018,508.

(60) Provisional application No. 63/131,970, filed on Dec. 30, 2020.

(51) Int. Cl.
　　　H01M 8/04858　　(2016.01)
　　　H02J 7/00　　(2006.01)
　　　H02J 13/00　　(2006.01)

(52) U.S. Cl.
　　　CPC ...... *H02J 7/0068* (2013.01); *H02J 13/00002* (2020.01); *H02J 13/00006* (2020.01); *H02J 2300/30* (2020.01)

(56) References Cited

U.S. PATENT DOCUMENTS

| | | | |
|---|---|---|---|
| 4,937,462 | A | 6/1990 | Recker |
| 5,317,500 | A | 5/1994 | Iden |
| 5,642,006 | A | 6/1997 | Cech |
| 5,767,591 | A | 6/1998 | Pinkerton |
| 6,080,500 | A | 6/2000 | Fuju |
| 6,112,136 | A | 8/2000 | Paul |
| 6,169,390 | B1 | 1/2001 | Jungreis |
| 6,172,432 | B1 | 1/2001 | Schnackenberg |
| 6,184,593 | B1 | 2/2001 | Jungreis |
| 6,239,997 | B1 | 5/2001 | Deng |
| 6,503,649 | B1 | 1/2003 | Czajkowski |
| 6,657,319 | B2 | 12/2003 | Sanada |
| 7,180,210 | B1 | 2/2007 | Jorgenson |
| 7,222,001 | B2 | 5/2007 | Frost |
| 8,203,231 | B2 | 6/2012 | Knepple |
| 11,018,508 | B1 | 5/2021 | Jorgenson |
| 2002/0114983 | A1 | 8/2002 | Frank |
| 2003/0197431 | A1 | 10/2003 | Lathrop |
| 2005/0183895 | A1 | 8/2005 | Severns |
| 2007/0193999 | A1 | 8/2007 | Peterson |
| 2007/0264537 | A1 | 11/2007 | Huang |
| 2009/0025315 | A1 | 1/2009 | Gutfleisch |
| 2009/0055031 | A1 | 2/2009 | Slota |
| 2009/0072791 | A1 | 3/2009 | Morita |
| 2012/0139354 | A1 | 6/2012 | Said |
| 2013/0183749 | A1 | 7/2013 | Aamodt |
| 2015/0217869 | A1 | 8/2015 | Brunaux |
| 2016/0134124 | A1 | 5/2016 | Kaan |
| 2018/0339594 | A1 | 11/2018 | Brown |
| 2019/0321500 | A1 | 10/2019 | Anderson |
| 2020/0238839 | A1 | 7/2020 | Miyaki |

OTHER PUBLICATIONS

High Integrity Power Control Systems for Critical Facilities by Russelectric; Exact Publication Date Unknown (Prior to Apr. 2004).
A Fast Following Synchonizer of Generators; IEEE Transaction of Energy Conversion, vol. 3, No. 4; Dec. 1988.
SYNCHROTACT 5 Synchronizing and Paralleling Equipment and Systems for Synchronous Machines and Networks by ABB Automation; Exact Publication Date Unknown (Prior to Apr. 2004).
Https://www.cdc.gov/infectioncontrol/pdf/guidelines/disinfection-guidelines-H.pdf; "Guideline for Disinfection and Sterilization in Healthcare Facilities"; Department of Health and Human Services/CDC; 2008.
Https://www.energy.gov/eere/fuelcells/fuel-cell-systems; "Fuel Cell Systems" Website Page; Department of Energy; 2017.
Https://www.energy.gov/sites/default/files/2015/11/f27/fcto_fuel_cells_fact_sheet.pdf; "Fuel Cells" Article from Fuel Cells Technologies Office at the U.S. Department of Energy; 2015.
Http://www.altergy.com/wp-content/uploads/2017/09/Altergy_Cable_Data_sheet_ATP_web.pdf; Altergy Cable/Multiple-System Operators Data Sheet; Received Aug. 28, 2019.
Http://www.altergy.com/wp-content/uploads/2016/08/Altergy_CorpBro_Web_singlePg.pdf; Altergy Corporate Brochure; Received Aug. 28, 2019.
Http://www.altergy.com/wp-content/uploads/2017/09/Altergy_Nacelle_Data_sheet_ATP_web.pdf; Altergy Freedom Power System Nacelle Data Sheet; Published Feb. 2017.
Http://www.altergy.com/wp-content/uploads/2017/09/Altergy_PSP_Data_sheet_6_ATP_web.pdf; Altergy Public Safety Platform Data Sheet; Published 2017.
Http://www.altergy.com/wp-content/uploads/2017/09/Altergy_Reformer_Data_sheet_7_ATP_web.pdf; Altergy Freedom Power System (FPS-EX) Data Sheet; Published Jun. 2018.
Http://www.altergy.com/wp-content/uploads/2018/07/Altergy_TSP_Data_sheet_2018_ATP_web.pdf; Altergy Traffic Signal Platform (TSP) Data Sheet; Published 2018.
Http://www.altergy.com/products-2/enclosures/; Altergy Enclosures Webpage; Received Aug. 28, 2019.
Http://www.altergy.com/products-2/mobile-solutions/; Altergy Mobile Solutions Webpage; Received Aug. 28, 2019.
Https://www.hydrogenics.com/hydrogen-products-solutions/fuel-cell-power-systems/; Hydrogenics HyPM-HD Power Modules Brochure; Published Feb. 2018.
Https://www.hydrogenics.com/technology-resources/media-downloads-table/; Hydrogenics HyPM-XR Back-Up Power Fuel Cell Brochure; Published May 2016.
Https://www.hydrogenics.com/technology-resources/media-downloads-table/; Hydrogenics HyPM Rack Brochure; Published Mar. 2014.
Https://www.intelligent-energy.com/uploads/product_docs/49087_IE_-_FCM_brochure_May_2018.pdf; Intelligent Energy 800 Series Fuel Cell Module Brochure; Published May 2018.
Https://www.intelligent-energy.com/uploads/product_docs/Final_UAV_brochure_Sept_2018_web.pdf; Intelligent Energy UAV Fuel Cell Power Module Brochure; Published Aug. 2018.
Https://www.plugpower.com/wp-content/uploads/2016/03/2016_GenKey_Stationary020816.pdf; Plug Power GenKey for Stationary Power Brochure; Published Feb. 8, 2016.
Https://www.plugpower.com/wp-content/uploads/2018/06/2018GenKeyBrochure_F1Digi-1.pdf; Plug Power GenKey for Material Handling Brochure; Published Jun. 2018.
Https://www.plugpower.com/products/progen/fuel-cells-for-industrial-robotics/; Plug Power ProGen Fuel Cells for Industrial Robotics Webpage; Received Aug. 28, 2019.
Https://www.arema.org/files/library/2014_Conference_Proceedings/Fuel_Cell_Technology_For_Backup_And_Supplemental_Power_Applications.pdf; Arema Fuel Cell Article; Jun. 13, 2014.
Https://www.plugpower.com/wp-content/uploads/2015/05/Intelec2011_ReliOn_P081_IEEE.pdf; ReliOn Smart Energy Solutions Article; Joe Blanchard; Published Nov. 2011.
Https://www.plugpower.com/wp-content/uploads/2015/05/ReliOnIntelec_2013Paper.pdf; ReliOn Superstorm Sandy: Fuel Cell Design Article; Spink and Saathoff; Published 2013.
Https://www.plugpower.com/wp-content/uploads/2018/06/2018_GenFuelSpec_F1Digi.pdf; Plug Power GenFuel Hydrogen Solutions for Material Handling Applications; Published Jun. 2018.
Https://www.plugpower.com/wp-content/uploads/2016/03/GenSureProductCatalogsm_012716.pdf; Plug Power GenSure Fuel Cell Systems Product Catalog; Published Mar. 2016.
Https://www.plugpower.com/wp-content/uploads/2014/12/ColdStorageDigi_F_101716.pdf; Plug Power GenDrive Fuel Cells for Cold Chain Environments Brochure; Published Dec. 2014.
Https://www.plugpower.com/wp-content/uploads/2016/07/Mfg_mktg_Final072216.pdf; Plug Power Fuel Cells for Manufacturing Facilities Brochure; Published Jul. 2016.
https://www.plugpower.com/wp-content/uploads/2019/04/ProGenSpec_Mobility_Digi0219.pdf; Plug Power ProGen Fuel Cell Power for E-Mobility Applications; Published Apr. 2019.
PCT International Search Report and Written Opinion for PCT/US2019/48543; Nov. 27, 2019.

REMOTELY CONTROLLED ELECTRICAL POWER GENERATING SYSTEM

CROSS REFERENCE TO RELATED APPLICATIONS

The present application is a continuation of U.S. application Ser. No. 17/564,563 filed on Dec. 29, 2021, which is a continuation-in-part of U.S. application Ser. No. 17/325,713 filed on May 20, 2021 now issued as U.S. Pat. No. 11,398,733, which is a continuation of U.S. application Ser. No. 16/745,448 filed on Jan. 17, 2020 now issued as U.S. Pat. No. 11,018,508. U.S. application Ser. No. 17/564,563 also claims priority to U.S. Provisional Application No. 63/131,970 filed on Dec. 30, 2020. Each of the aforementioned patent applications is herein incorporated by reference in their entirety.

STATEMENT REGARDING FEDERALLY SPONSORED RESEARCH OR DEVELOPMENT

Not applicable to this application.

BACKGROUND

Field

Example embodiments in general relate to a remotely controlled electrical power generating system for providing safe and efficient backup, emergency, or supplemental AC power.

Related Art

Any discussion of the related art throughout the specification should in no way be considered as an admission that such related art is widely known or forms part of common general knowledge in the field.

Conventional backup electrical generators, especially those suited for relatively high power output, may comprise diesel or gasoline engines. Such generators may be less desirable for operation in closed spaces, such as inside of buildings, shipboard, in tunnels, etc., due to noise considerations, the danger of storing and handling fuel, and toxic exhaust fumes. Further, many generators are not capable of using a building's in-place wiring to provide power within the building.

Conventional utility demand management in the past has typically been implemented by systems that shut off selected electrical appliances and loads, which may inconvenience customers.

SUMMARY

An example embodiment is directed to a remotely controlled electrical power generating system. The remotely controlled electrical power generating system includes a fuel cell comprising a first DC output; an electrical storage unit comprising a DC input coupled to the first DC output of the fuel cell, the electrical storage unit further comprising a second DC output; an inverter coupled to the second DC output of the electrical storage unit to receive power, the inverter comprising a first AC output; a contactor connected between the first AC output and an AC load bus, the AC load bus comprising an AC voltage; and a controller comprising inputs adapted to sense a phase, a frequency, and a magnitude of the first AC output and the AC voltage. Alternatively, the primary power source may be or include a generator or alternator and a rectifier to provide a DC output to the inverter, so that a fuel-powered generator can be used in place of a fuel cell to power the system.

The controller controls the phase, the frequency, and the magnitude of the first AC output of the inverter. The controller may further comprise an output command to selectively activate the contactor when a relationship between the phase, the frequency, and the magnitude of the first AC output and the AC voltage are substantially matched.

In some example embodiments, the controller is usable to adjust the phase, the frequency, and the magnitude of the first AC output of the inverter to cause them to substantially match the phase, the frequency, and the magnitude of the AC voltage on the AC load bus before the controller sends the output command. In still other embodiments, the controller is further adapted to communicate with a remote computing device, which may be a wired or a wireless device. The remote computing device is adapted to send a command to the controller to connect the electrical power generating system to the AC load bus, and it may also perform other functions. As an example, the remote computing device may be adapted to allow a user to monitor operating conditions of the electrical power generating system. The remote computing device may also be adapted to send a command to the controller to disconnect the electrical power generating system from the AC load bus, or to remotely shut down the electrical power generating system.

In still other example embodiments of the electrical power generating system activating the contactor causes the first AC output to be connected in parallel with the AC voltage on the AC load bus.

Still further, the electrical power generating system may comprise a second fuel cell comprising a third DC output, a second electrical storage unit comprising a second DC input coupled to the third DC output of the second fuel cell, the second electrical storage unit further comprising a fourth DC output. The embodiment may also comprise a second inverter coupled to the fourth DC output of the second electrical storage unit to receive power, the second inverter comprising a second AC output, and a second contactor connected between the second AC output and the AC load bus, and a second controller comprising second inputs adapted to sense a second phase, a second frequency, and a second magnitude of the second AC output and the AC voltage, wherein the second controller controls the second phase, the second frequency, and the second magnitude of the second AC output of the second inverter.

The second controller may further comprise a second output command to selectively activate the second contactor when a relationship between the phase, the frequency, and the magnitude of the second AC output and the AC voltage are substantially matched. In some embodiments, activating the second contactor causes the second AC output to be connected in parallel with the first AC output.

Further, the second controller may adjust the phase, the frequency, and the magnitude of the second AC output to cause them to substantially match the phase, the frequency, and the magnitude of the AC voltage on the AC load bus before the second controller sends the output command.

In an example embodiment, the second controller is further adapted to communicate with a remote computing device, which may be the same device or a separate device from the one that communicates with the first controller. Further, the remote computing device may be a wired or a wireless device. The remote computing device may also be adapted to send a command to the second controller to connect the second AC output to the AC load bus. For example, the remote computing device may be adapted to send a command to the second controller to activate or deactivate the second contactor.

Further, the remote computing device may be adapted to allow a user to monitor operating conditions of the electrical power generating system, and specifically, either of two or more generators being used, singly or in parallel, to provide power to the AC load bus. In addition, the remote computing device may be adapted to send a command to the second controller to shut down the second fuel cell.

Using the electrical power generating system may comprise activating the fuel cell, monitoring the phase, frequency, and magnitude of the AC voltage of the AC load bus, and adjusting the phase, frequency, and magnitude of the first or second AC output, or both of them, to substantially match the phase, frequency, and magnitude of the AC voltage of the AC load bus, and activating the contactor or contactors to connect the first, second, or both AC outputs to the AC load bus.

There has thus been outlined, rather broadly, some of the embodiments of the electrical power generating system in order that the detailed description thereof may be better understood, and in order that the present contribution to the art may be better appreciated. There are additional embodiments of the electrical power generating system that will be described hereinafter and that will form the subject matter of the claims appended hereto. In this respect, before explaining at least one embodiment of the electrical power generating system in detail, it is to be understood that the electrical power generating system is not limited in its application to the details of construction or to the arrangements of the components set forth in the following description or illustrated in the drawings. The electrical power generating system is capable of other embodiments and of being practiced and carried out in various ways. Also, it is to be understood that the phraseology and terminology employed herein are for the purpose of the description and should not be regarded as limiting.

BRIEF DESCRIPTION OF THE DRAWINGS

Example embodiments will become more fully understood from the detailed description given herein below and the accompanying drawings, wherein like elements are represented by like reference characters, which are given by way of illustration only and thus are not limitative of the example embodiments herein.

DETAILED DESCRIPTION

A. Overview

Figure 1:
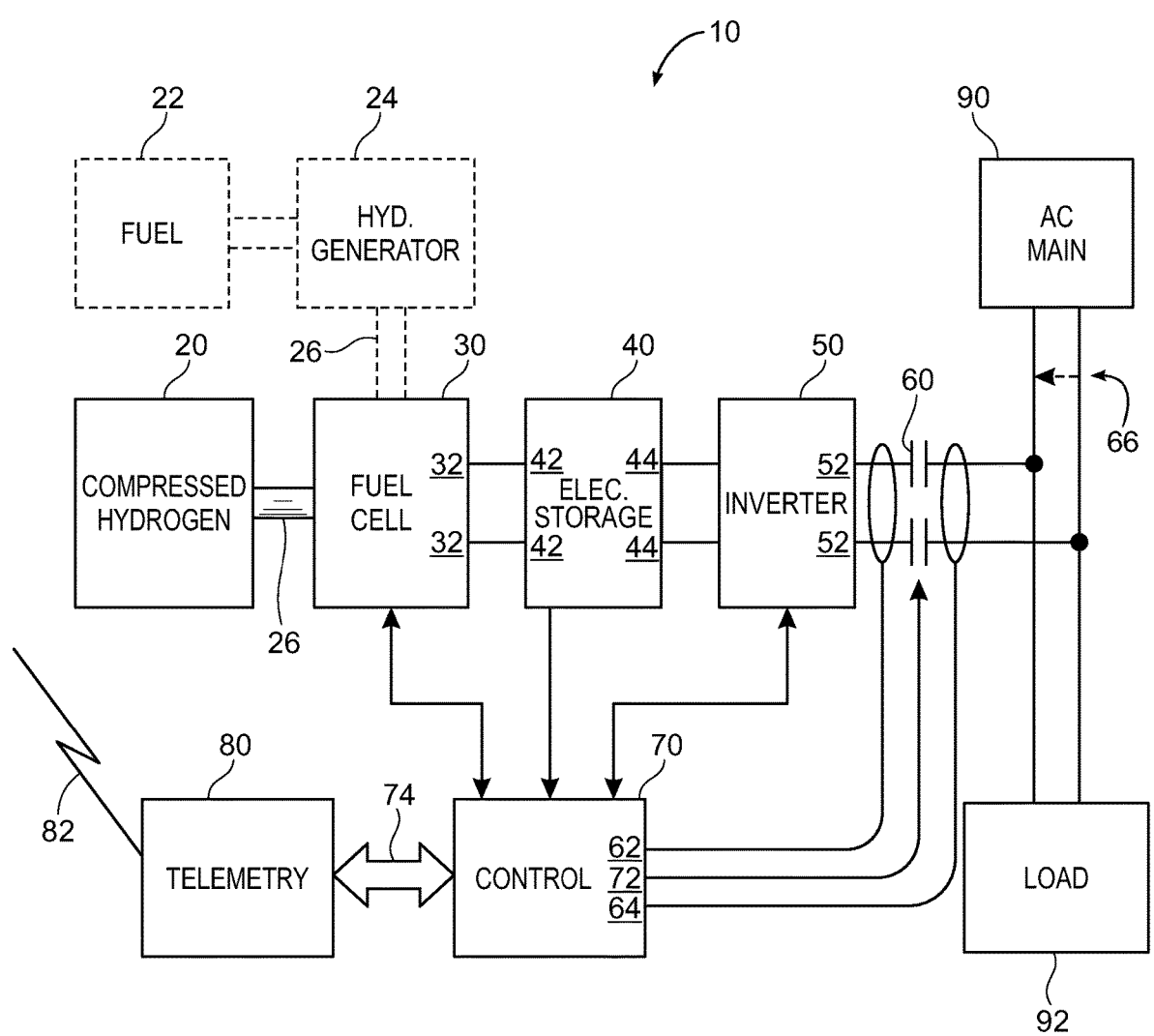
FIG. 1 is a simplified block diagram of an electrical power generating system in accordance with an example embodiment.

An example electrical power generating system 10 generally comprises a fuel cell 30 comprising a first DC output 32, an electrical storage unit 40 comprising a DC input 42 coupled to the first DC output 32 of the fuel cell 30, the electrical storage unit 40 further comprising a second DC output 44, an inverter 50 coupled to the second DC output 44 of the electrical storage unit 40 to receive power, the inverter 50 comprising a first AC output 52, a contactor 60 connected between the first AC output 52 and an AC load bus 66, the AC load bus 66 comprising an AC voltage, and a controller 70 comprising inputs 62, 64 adapted to sense a phase, a frequency, and a magnitude of the first AC output 52 and the AC voltage on the load bus 66, respectively.

A different power source 100 may also be used in place of a fuel cell 30, and may comprise a mechanical generator or alternator combined with a rectifier. The power source 100 may also include an electrical storage unit 40 and an inverter 50, such that the power source 100 can be used to receive fuel from a fuel source 102 via fuel line 104, and thus provide the first AC output 52. Telemetry component 80 may have a control bus to power source 100, and may be used to control the power source 100 as discussed herein. The system 10 may also include a synchronizer 106 between the power source and the AC main 90 or an AC load 92, to allow the power source 100 to provide AC power that is synchronized in phase, frequency, and magnitude.

The controller 70 controls the phase, the frequency, and the magnitude of the first AC output 52 of the inverter. The controller 70 may further comprise an output command 72 to selectively activate the contactor 60 when a relationship between the phase, the frequency, and the magnitude of the first AC output 52 and the AC voltage are substantially matched.

In some example embodiments, the controller 70 is usable to adjust the phase, the frequency, and the magnitude of the first AC output 52 of the inverter 50 to cause them to substantially match the phase, the frequency, and the magnitude of the AC voltage on the AC load bus 66 before the controller 70 sends the output command. In still other embodiments, the controller 70 is further adapted to communicate with a remote computing device 95, which may be a wired or a wireless device. The remote computing device 95 is adapted to send a command to the controller 70 to connect the electrical power generating system 10 to the AC load bus 66, and it may also perform other functions. As an example, the remote computing device 95 may be adapted to allow a user to monitor operating conditions of the electrical power generating system 10. The remote computing device 95 may also be adapted to send a command to the controller 70 to disconnect the electrical power generating system 10 from the AC load bus 66, or to remotely shut down the electrical power generating system 10.

The system 10 can also be controlled remotely by an external controller, such as utility control system 96, which can communicate with and provide input to the controller 70, and also telemetry component 80. The external controller can be operated by a utility or a managing entity, such that the external controller can enable the controller 70 to activate the output command to the contactor 60.

21 In still other example embodiments of the electrical power generating system 10, activating the contactor 60 causes the first AC output 52 to be connected in parallel with the AC voltage on the AC load bus 66, which is possible due to the synchronization of the voltage parameters as discussed above.

Further, the electrical power generating system 10 may include more than one power source subsystem, such as a second fuel cell or power source (e.g., generator or alternator), inverter, and the other components mentioned above, and the components or subsystems can be connected in parallel. As an example, two or more subsystems of the present system 10 may be connected in parallel over an AC load bus 66, such as a building or house's existing wiring, effectively using that wiring as a micro-microgrid. In such a case, one, two, or more subsystems can be connected to the AC load bus 66 while the bus is also powered by an AC main power source 90, such as a city's electrical grid, with the electrical power generating system 10 adding additional, local power capacity to the wiring.

The system 10 can also be used to provide backup or emergency power to the AC load bus 66 with no other power source available. Use of existing wiring as a micro-microgrid is possible because the system uses analog power line synchronization for matching or substantially matching voltage, frequency, and phase of the generated AC output to any voltage present on the existing AC load bus, either from the AC main source 90 or another fuel cell/inverter of system 10 connected in parallel. An electrical power generating system 10 of the present system may comprise one or more generators, since each may be substantially the same, and because each may be connected to the AC load bus 66 at the same time, thus becoming part of the overall system 10.

For indoor operations, the system 10 can be entirely contained on a portable, wheeled cart 14, sized to readily fit through doorways and hallways of hotels, industrial buildings, etc. Furthermore, the system can easily be connected to existing building wiring (e.g., conventional and standard 120V building or residential wiring) by providing an output in the form of standard 120V power cords that can simply be plugged into one or more power outlets of the existing wiring system, thus using the existing wiring as a micro-microgrid with no special wiring equipment needed.

As an alternative to a portable setup, the remote- or externally-controllable electrical power generating system can be permanently installed. If so, it may be installed in a mechanical room of a building or residence, next to the heating system and the main electrical panel, which allows the AC output of the system to be connected to the building's or house's wiring, through a contactor that allows for paralleling or isolating connections. For buildings that are heated using propane or natural gas, the gas line that is connected to the furnace and heating elements may be connected to the reformer, or to a generator (i.e., if a generator of the system is a natural gas generator). The purpose of the reformer is to locally produce hydrogen of purity and volume sufficient for the fuel cell system to power the building, or to provide supplemental power to the building. The byproduct of the reformer may be vented to the exterior of the building, and may use the same venting system as the heating system of the building.

The system also includes a telemetry component 80 for remote monitoring and system management. For example, parameters such as run time, fuel amount, power output, output voltage, output current, etc., may be monitored via telemetry. The telemetry component 80 also allows the remote computing device 95, such as a wireless phone, laptop, desktop computer, etc., to remotely start the system or any subsystem, shut down the system, or to connect or disconnect any individual contactor or group of contactors to the micro-microgrid.

Figure 3:
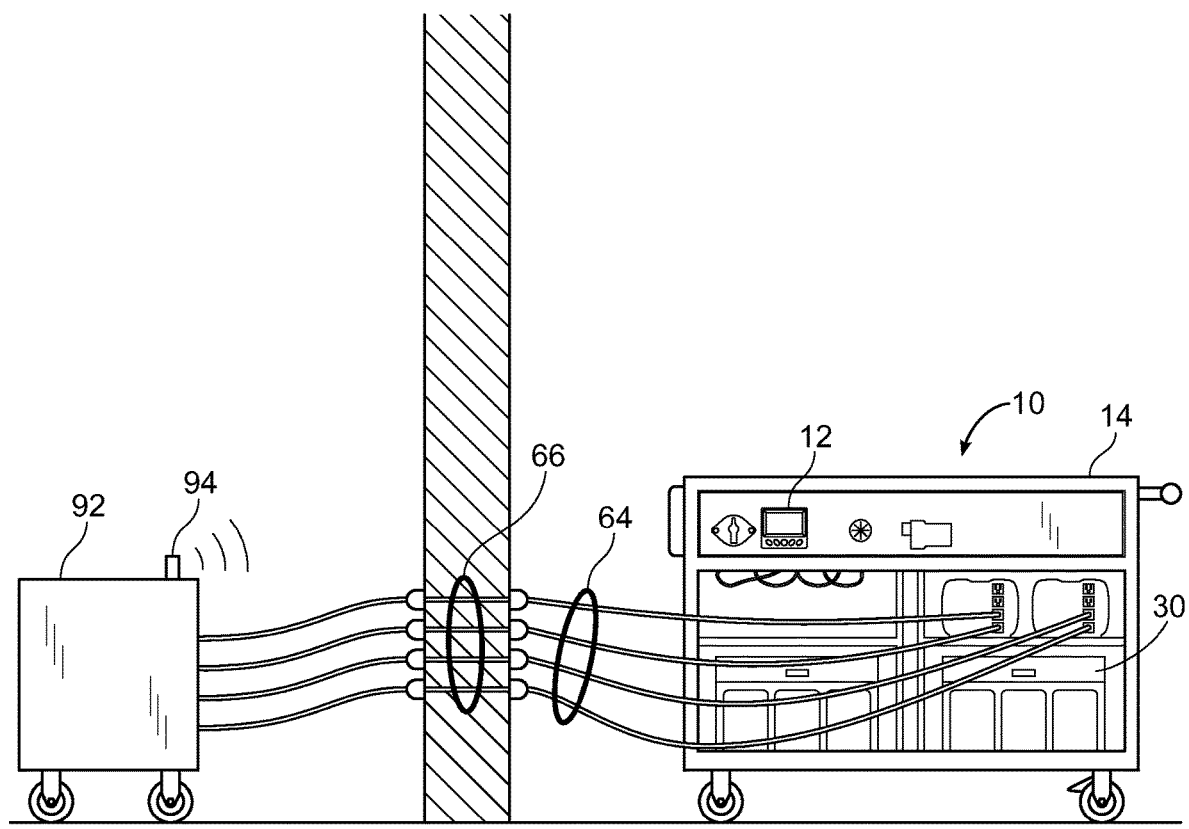
FIG. 3 is a perspective view illustrating a use of an electrical power generating system in accordance with an example embodiment.
Figure 4:
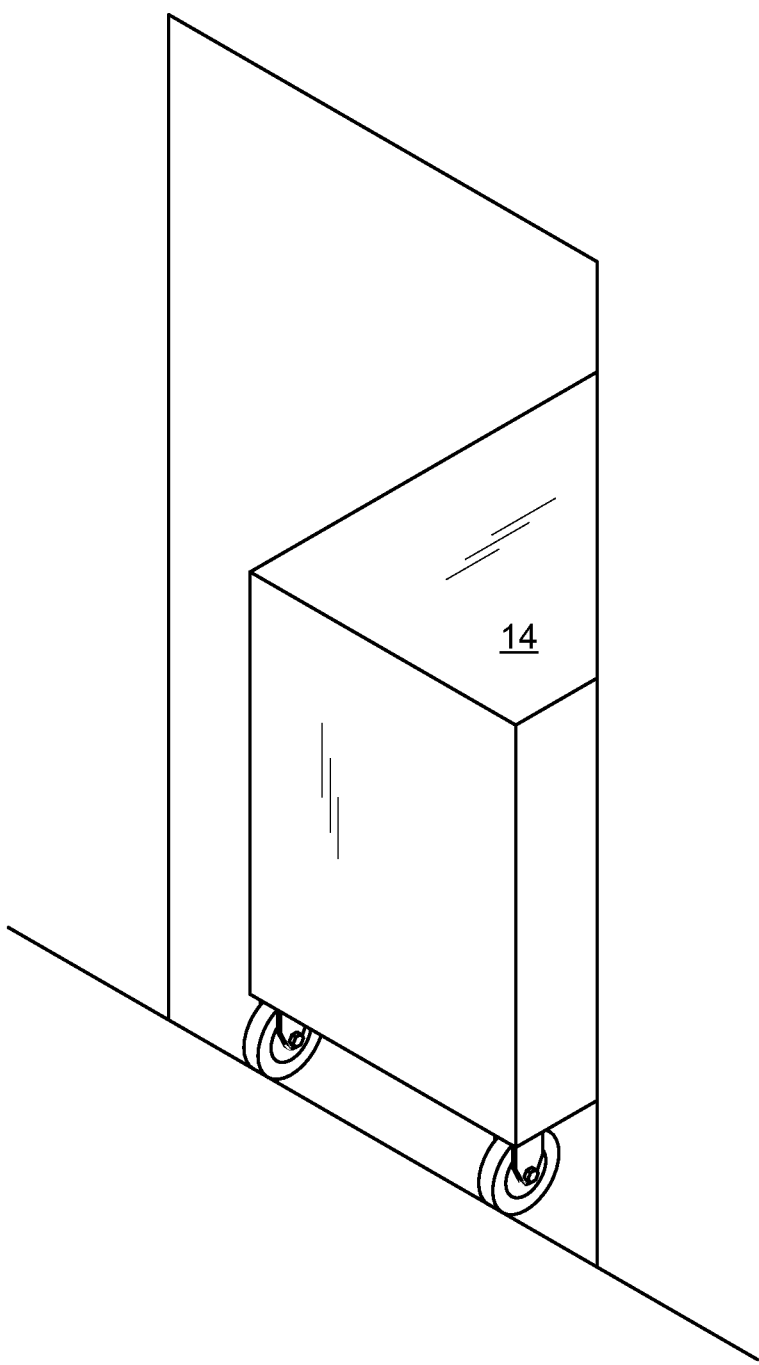
FIG. 4 is another perspective view illustrating a portable electrical power generating system in accordance with an example embodiment.
Figure 5:
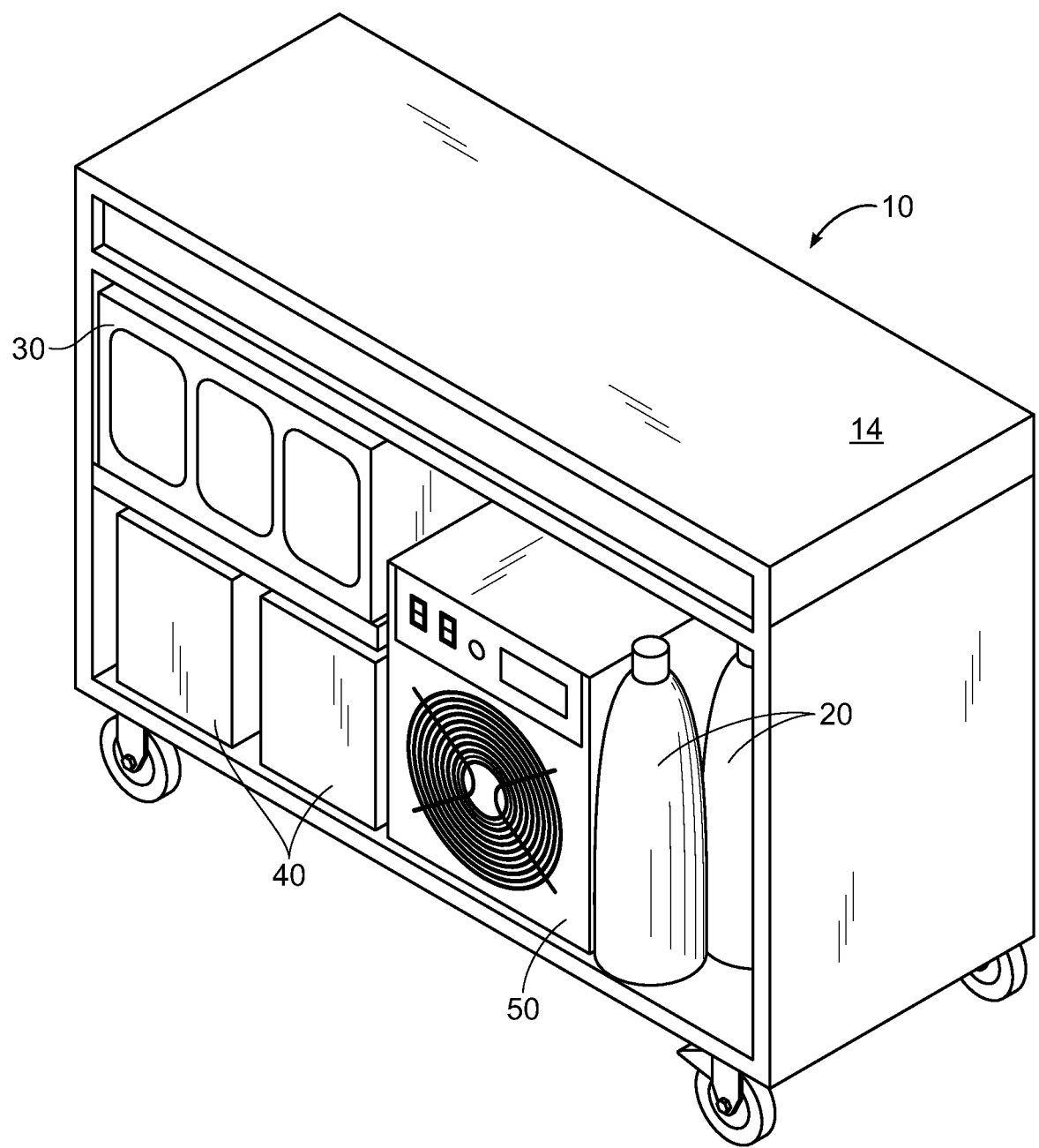
FIG. 5 is another perspective view illustrating a portable electrical power generating system in accordance with an example embodiment.

One possible physical configuration of the electrical power generating system 10, or a subsystem (if more than one generating unit is to be used to supply power) is shown in FIGS. 4 and 5. As shown in FIG. 4, all the components of a single unit can be mounted on a wheeled cart 14 that is sized to fit in doorways and hallways of buildings, such as hotels or commercial establishments. One possible arrangement of the major physical components is shown in FIG. 5, which is also representative of the main components shown in FIG. 1. The power output of an electrical power generating system 10 can be supplied over ordinary power cords that can be plugged into a building's existing outlets, as shown in FIG. 3, so that no special connections are required for the supply of auxiliary or emergency power.

B. Fuel Cell

The electrical power generating system 10 may make use of compressed hydrogen gas 20 as a source for the fuel cell 30. Compressed hydrogen gas is readily available from industrial gas suppliers. The hydrogen gas 20 is kept in a storage tank or tanks of the system 10, and is regulated to low pressures and provided over a supply line 26 to a fuel cell 30, as generally shown in FIG. 1. Compressed hydrogen gas is easy to use and transport, and provides for economical operation of the fuel cell 30. The fuel system includes connections of the fuel from storage vessels to generators, and can further include manifolds, regulators, shutoff valves, purge valves, and a tubing system to prevent leakage of hydrogen and prevent the introduction of contaminants.

For indoor use, using purified hydrogen as a fuel source for the input of a fuel cell or cells has distinct advantages over other sources. For example, some fuel cell systems use or propose reformers to provide hydrogen from a liquid feedstock. However, the turn-on time for reformers is relatively long. For example, based on current technologies, it may take eight to twelve hours to reach the temperatures needed to produce hydrogen from a liquid feedstock. If a reformer is used, the feedstock may be a liquid source (such as a methanol-deionized water blend), natural gas, propane, or other source of hydrocarbons that may be reformed into hydrogen. The output of the reformer is hydrogen gas, which can either be stored in a pressure vessel (e.g., a storage vessel) or connected directly to the hydrogen input of one or more fuel cells.

The fuel cell or cells combine hydrogen and atmospheric oxygen to produce electricity, with additional byproducts of water vapor and heat. In an example embodiment, the source for the atmospheric oxygen may be vented from the exterior of the building, using an air exchanger or other venting system. This venting may or may not be the same venting used for the delivery of fresh air to a natural gas or propane heating system if such a system is installed in the building. The heat created by the fuel cell may advantageously be used in the interior of the building as a heat source during cold outdoor temperatures, or may be vented to the exterior of the building in the event that heat is not desired. In addition, the fuel cell or cells may use an advanced cooling system, such as a liquid cooled or an evaporatively cooled system to dissipate the heat created by the fuel cell(s).

This time may be reduced if a heater is continually operated, but continuous use of a heater may consume, for example, 200 W to 500 W in standby mode without any productive use being made of the system, thus greatly reducing the overall efficiency, especially for a system used to produce, for example, a relatively small amount of power, such as 2 kW.

Further, the process of reforming liquid fuel is not zero emission, and produces CO and $CO_2$, which can be dangerous in indoor or confined environments. In contrast, hydrogen fuel cells produce no harmful emissions, so there is no need to store or otherwise dispose of any byproducts or toxic fuel. Hydrogen fuel cells have a proven track record of safe indoor use, such as fuel-cell powered forklifts in material handling applications. Furthermore, compressed hydrogen systems are relatively compact, and can, for example, allow an entire 2 kW to 8 kW system to be constructed on a portable cart 14 that will easily fit through hotel and building doorways and hallways.

Despite the advantages of using compressed hydrogen gas 20, the system may alternatively use a different fuel 22 in combination with a hydrogen generator 24, (e.g., a reformer) as also shown in FIG. 1. The output of the hydrogen generator 24 is fed to the fuel cell 30 by alternate supply line 26, just as in the case where hydrogen gas is used directly. As an example, methanol can be used as a feedstock to produce hydrogen. Once the hydrogen fuel is produced in the alternative embodiment, operation of the system is substantially the same.

In an example embodiment, the fuel cell 30 may comprise multiple fuel cells, which are designed to achieve the total voltage output and power desired. In each fuel cell of a fuel cell that uses hydrogen as fuel, electricity is generated with no combustion or harmful byproducts, by an electrochemical reaction that uses, for example, a stack of proton exchange membrane (PEM) fuel cells. PEM fuel cells have a high power density and operate at relatively low temperatures; as a result, they allow the fuel cell to quickly warm up and begin generating electricity. Other fuel cell technologies may also be used with the present system, such as alkaline fuel cells, zinc oxide, phosphoric acid fuel cells, molten-carbonate, solid oxide, etc.

C. Power Source

Figure 13:
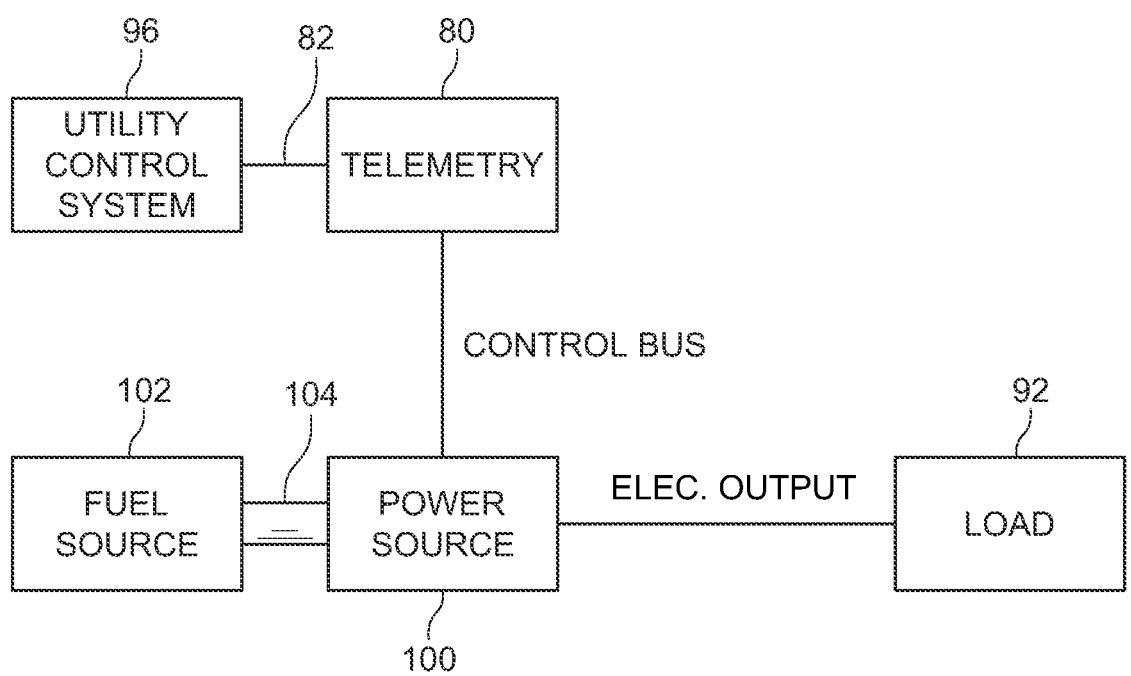
FIG. 13 is another simplified block diagram of an electrical power generating system in accordance with another example embodiment.
Figure 14:
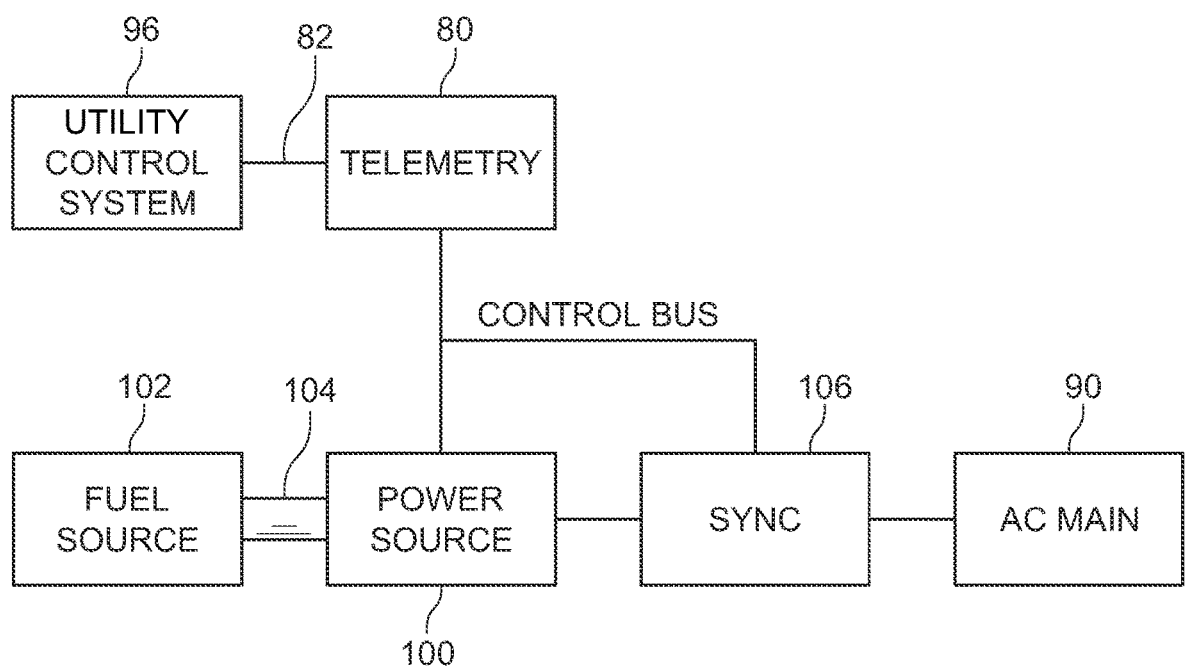
FIG. 14 is another simplified block diagram of an electrical power generating system in accordance with another example embodiment.

The electrical power generating system 10 may also use a power source 100, as shown in FIGS. 13 and 14. The power source 100 may be or include a fuel cell, and may also include a generator that uses fuel source 102, and may also include electrical storage 40 and one or more inverters, such as inverter 50. The systems shown in FIGS. 13 and 14 are simplified for clarity, but can include the components shown in more detail in FIG. 1, such as contactor 60 which is used to connect and disconnect the AC output of the system from a load 92 or the AC main 90. Fuel source 102 may be a local source of fuel, such as gasoline, diesel, kerosene, or bottled hydrogen. The fuel may also be provided over a supply line from a utility, and the fuel can be provided to the power source 100 by local fuel line 104.

D. DC to AC Conversion

The electrical storage unit 40 is the first part of the system to receive power from the fuel cell 30 or power source 100, and it provides for storage of DC power that is to be provided to the inverter 50 for conversion to AC power. The electrical storage unit 40 may comprise a battery or bank of batteries, which receive and store DC electrical power to be provided to the inverter 50, as also shown in FIG. 1. Electrical storage unit 40 receives power from the fuel cell at DC input 42, as shown, and provides power via DC outputs 44, which are coupled electrically (conductively) to inverter 50. Electrical storage unit 40 may comprise multiple high-capacity, high-power rechargeable batteries and a battery charging system (not shown), which receives input power from the fuel cell 30 and conditions it in order to keep the batteries of the storage unit 40 optimally charged. Electrical storage unit 40 may also be used to power the controller 70, as well as other components of system 10, upon startup of the system. Electrical storage unit 40 provide for load smoothing, energy storage, and offline energy availability. During operation of the system, if the system controller detects that the batteries in the electrical storage unit 40 are in a discharged state, the fuel cell or generator will automatically go into an active mode to produce electricity to charge the electrical storage unit 40.

4 In addition, since the electrical storage unit 40 is connected to the inverter 50, the unit 40 provides power to the inverter 30 along with that provided by the fuel cell 30, and thus may help the system meet higher transient power demands if the instantaneous power demanded of the system exceeds the capacity of the fuel cell 30. The electrical storage unit 40 also acts as an energy buffer, helping to smooth any variability in the output of the fuel cell 30 before it reaches the inverter 50.

Figure 2:
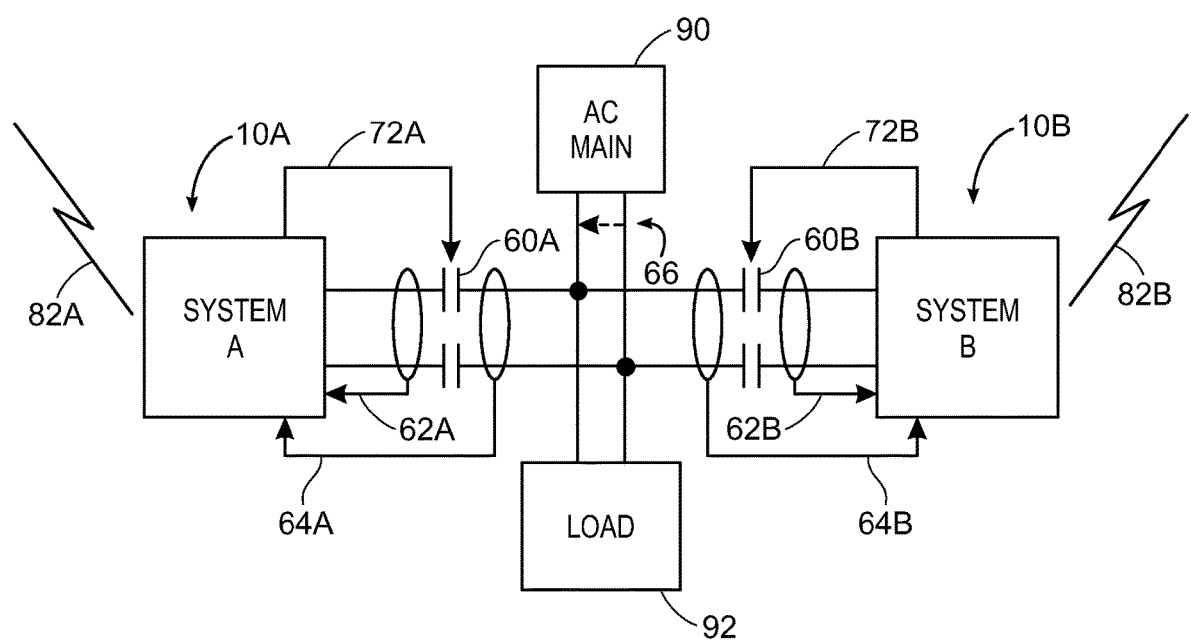
FIG. 2 is another simplified block diagram of an electrical power generating system in accordance with an example embodiment.

The inverter 50 may comprise a single inverter, or it may comprise two or even more units connected and controlled to operate in parallel. In any configuration, the inverter 50 is operated under the control of controller 70 to provide an adjustable, preferably sinusoidal AC output 52 that can be controlled in phase, frequency, and voltage to match a voltage present on an AC load bus 66, such as building wiring, as best shown in FIGS. 1 and 2. More specifically, the output of the inverter 50, once synchronized, may readily be connected directly to a standard 120/240 volt National Electrical Code building wiring system, and can in fact use the existing wiring as a micro-microgrid which can provide power from any of a number of sources to any AC load connected to the wiring system.

The use of a battery (e.g., storage unit 40) in the system provides a local means to store energy produced by the fuel cell 30 before being consumed by the electrical loads being powered. The storage unit 40 then provides instantaneous energy delivery, which provides a smoothing function for the load as the electrical demand changes in magnitude. The storage unit 40 also provides startup power for the fuel cell 30 prior to the consumption of hydrogen for electrical production. The output of the storage unit 40 provides inputs to the inverter 50 for the production of AC power as well directly providing stabilized DC power (either at voltage at the potential level of the batteries or at any other DC voltage via the means of a DC/DC voltage converter, regulator, comparator, control logic that manages a feedback loop for producing an output voltage that is consistent with a desired target voltage, and/or voltage division circuitry.)

For applications where the delivered energy is to be an AC waveform, inverter(s) are integrated to convert the DC electricity to AC waveforms. The AC waveform may be of selectable or adjustable voltage (for example, 120V or 240V), of selectable or adjustable frequency (for example, 50 Hz or 60 Hz), or phases (for example, single phase or three phase). In certain applications, multiple inverters 50 may be employed to create a plurality of AC voltages, where the settings of the first inverter (for example, 120V, 60 Hz, single phase) may be different than the settings of the second inverter (for example 240V, 50 Hz, three phase).

The AC power output of the system may be a standalone power source for a house, building, or for a specific function. In the event that the output of the externally-controller electrical power generating system is to be synchronized with another source or a bus, a synchronizer, such as synchronizer 106 or a synchronizer within controller 70 is included for the phase, voltage, and frequency match of two signals or sources. The synchronizer 106 or controller 70 will independently monitor two or more electrical power connections, one connection from generating system 10 and one connection from the external signal or source that is to be synchronized, and determine a synchronization point when the differences in phase, frequency, and voltage are minimal. A contactor 60 is closed at the synchronization point, and the two systems are connected to sum the individual powers to the electrical load.

E. Controller

The controller 70 performs synchronization and control functions necessary for operation of the system 10. Before the system is started and running, the electrical storage unit 40 provides power to the controller 70, which may be off until a power or start button is pressed, at which point the controller begins to operate. The controller 70 may control valves and regulators (not shown) used to activate the fuel cell 30. The controller may also be included with power source 100 such that power source 100 can receive input from telemetry component 80 and provide or receive any outputs or inputs needed for telemetry and control of the system. The controller 70 also receives AC voltage inputs to monitor and control the output of the system, as shown in FIGS. 1 and 2. For example, the controller receives AC input 62 from the output of inverter 50, to monitor and control the phase, frequency, and magnitude of the inverter 50. The controller 70 may comprise an analog synchronizer to bring these voltage parameters into substantial synchronization with the AC voltage on the AC load bus 66, monitored at input 64 of the controller 70. Additional details regarding synchronization and thresholds for closing contactor 60 may be found in U.S. Pat. No. 7,180,210, which is hereby incorporated by reference.

The controller also provides an output command 72 to selectively activate or deactivate a contactor 60. As shown in FIGS. 1 and 2, contactor 60 is operable to connect and disconnect the AC output 52 of the portable electrical power generating system 10 from the AC load bus 66. Although the contactor is shown in the figures as having two contacts, different configurations are also possible. For example, the contactor 60 may be configured to connect or disconnect just the active voltage line, with neutral being directly connected. In addition, the system is shown as supplying a single phase, but in practice the system may be used with multiple phases or to supply both sides of a 240-volt (three-wire) configuration.

As discussed in greater detail below, when the AC output 52 of the inverter 50 is connected to the AC load bus 66, it is done in a "make before break" manner, such that the AC output 52 is connected in parallel with the voltage already present on the load bus 66, which requires the synchronization, or substantial matching, of the AC output 52 to the voltage on the load bus 66.

In addition to the output control functions, the controller 70 may also be adapted to interface with, or to include, a telemetry component 80. If the telemetry is a separate component, it can be adapted to communicate with the controller 70 via an internal communication link 74, which may be in various forms, such as wired or wireless analog and/or digital links. In addition to the automatic functions of the controller 70, the system 10 can use telemetry for remote monitoring and control, which can be done over a communications link 82, such as an air interface and internet connection, or a wired connection between a utility and a customer's house or building, by way of non-limiting example. An overview of the remote monitoring and control functionality is best illustrated in FIG. 7, which shows a remote computing device, such as a smart phone, tablet, laptop or desktop computer, etc., in communication with three portable generating subsystems A, B, and C, which comprise an electrical power generating system 10 which is connectable to the load bus 66.

FIGS. 13 and 14 also illustrate an overview of the remote monitoring and control functionality using a utility control system 96, which, again, controls the system through telemetry component 80 in conjunction with controller 70. As shown in FIG. 14, the controller 70 within power source 100 can control synchronization unit 106, which can synchronize AC voltages (i.e., phase, frequency, and magnitude) between the power source 100 and AC main 90, and can also disconnect the AC output using contactor 60 (as illustrated in FIGS. 1 and 2) to isolate or parallel the power source 100 from the AC main 90 or a separate AC load 92.

As mentioned above, each subsystem A, B, and C in FIG. 7 may be configured substantially as the single unit shown in FIG. 1, which is possible because each subsystem can be connected in parallel, and can operate independently. Accordingly, element numbers followed by letters, such as 62A, are directly equivalent to numbers with no letters, such as 62, as represented in FIG. 1.

Figure 7:
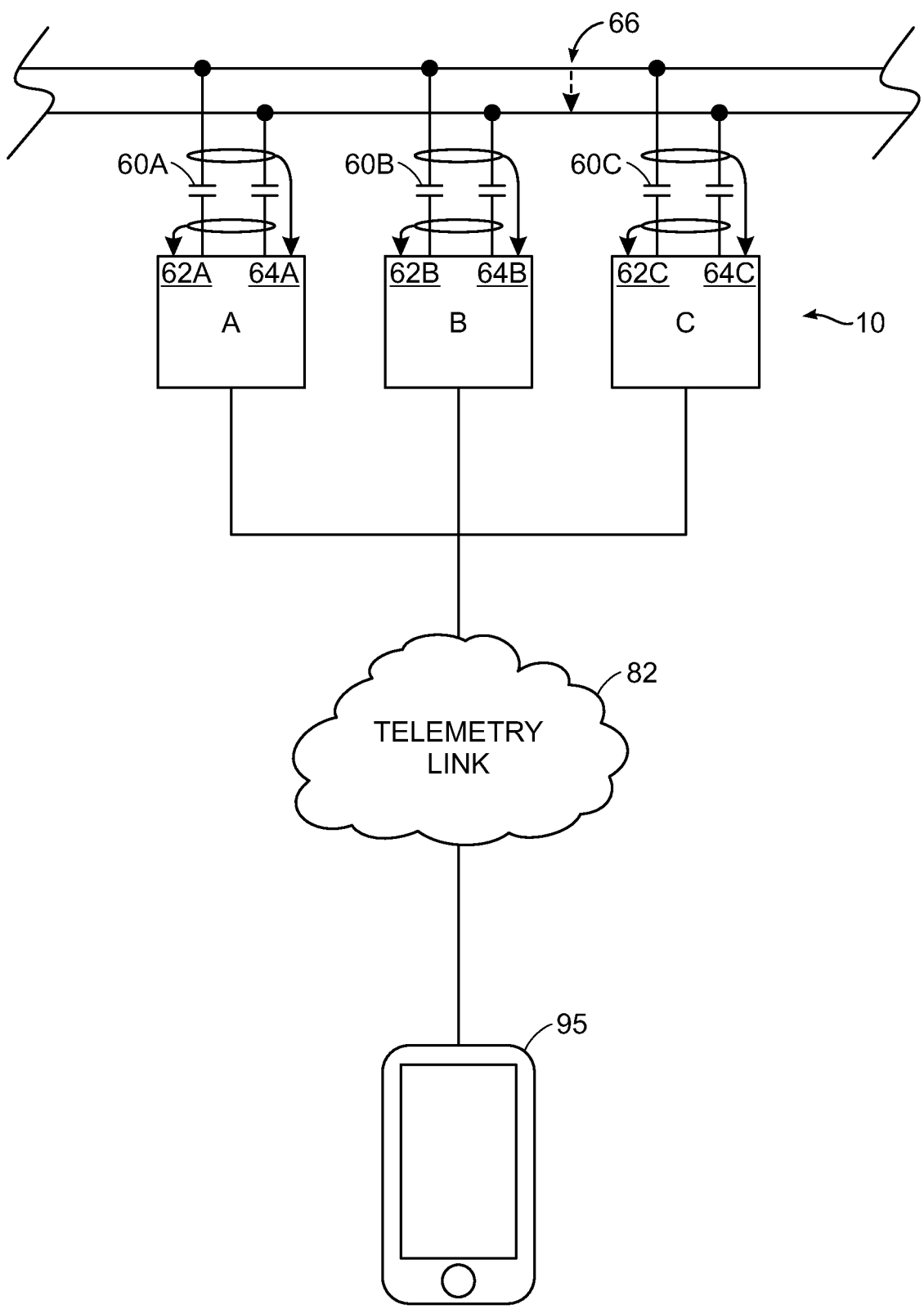
FIG. 7 is another simplified block diagram of an electrical power generating system in accordance with an example embodiment.

As also shown in FIG. 7, the controller of each subsystem receives AC voltage inputs to monitor and control the output of the system, and to synchronize all units with the voltage on the load bus 66. Alternatively, the system may power an otherwise unpowered load bus (e.g., with no AC main source connected) to provide auxiliary, emergency, or backup power.

In the embodiment of FIG. 7, each subsystem receives AC inputs 62A, 62B, or 62C from the output of each inverter, to monitor and control the phase, frequency, and magnitude of the inverter as described above. Each controller 70 may then bring the voltage parameters into substantial synchronization with any AC voltage on the AC load bus 66, monitored at inputs 64A, 64B, and 64C, as shown. As with the single system connection of FIG. 1, each subsystem A, B, or C controls its own contactor, 60A, 60B, and 60C, respectively, in order to connect or disconnect the subsystem AC inverter output from the bus, again using the load bus 66 to substantially synchronize of substantially match the voltage parameters so that the systems can be connected in parallel.

FIG. 2 illustrates the system with two subsystems A and B connectable in parallel, where either or both subsystem can provide power to the load bus 66, either in addition to or in lieu of AC main power source 90, in order to power load or loads 92. As with the singe system of FIG. 1, each subsystem includes an input 62A or 62B (directly equivalent to input 62 of FIG. 1) to monitor and control the inverter output voltage, as well as inputs 64A and 64B to monitor the AC load bus voltage for control purposes. In addition, each subsystem, A, B, has control over a contactor 60A or 60B to connect and disconnect the AC output voltage to or from the load bus 66, using control outputs 72A or 72B, as shown. Since FIG. 2 simply illustrates two of the systems shown in FIG. 1, connectable in parallel, the labels appended with "A" and "B" are directly equivalent to the inputs, outputs, etc., without those designations as shown in FIG. 1.

26 In this configuration, both subsystems can be used to supply power in parallel with the AC main source 90, or alternatively, to supply power to bus 66 with no AC main power available, in which case subsystem A and B would be synchronized with each other. For telemetry, subsystem A may use communication link 82A, and subsystem B may use communication link 82B, to receive commands and allow for remote monitoring and control of the system.

As shown in FIG. 2, two or more systems may be connected at the AC level via a means of synchronization to collectively supply the energy consumed by the electrical loads. The load sharing between two (or more) fuel cell systems allows the fuel cells to collectively supply the energy demanded by the load, where the instantaneous load is powered by the storage unit 40 connected to the loads via the inverter(s) 50, and the fuel cell(s) recharge the storage unit 40 to full capacity.

F. Operation of Preferred Embodiment

Figure 6:
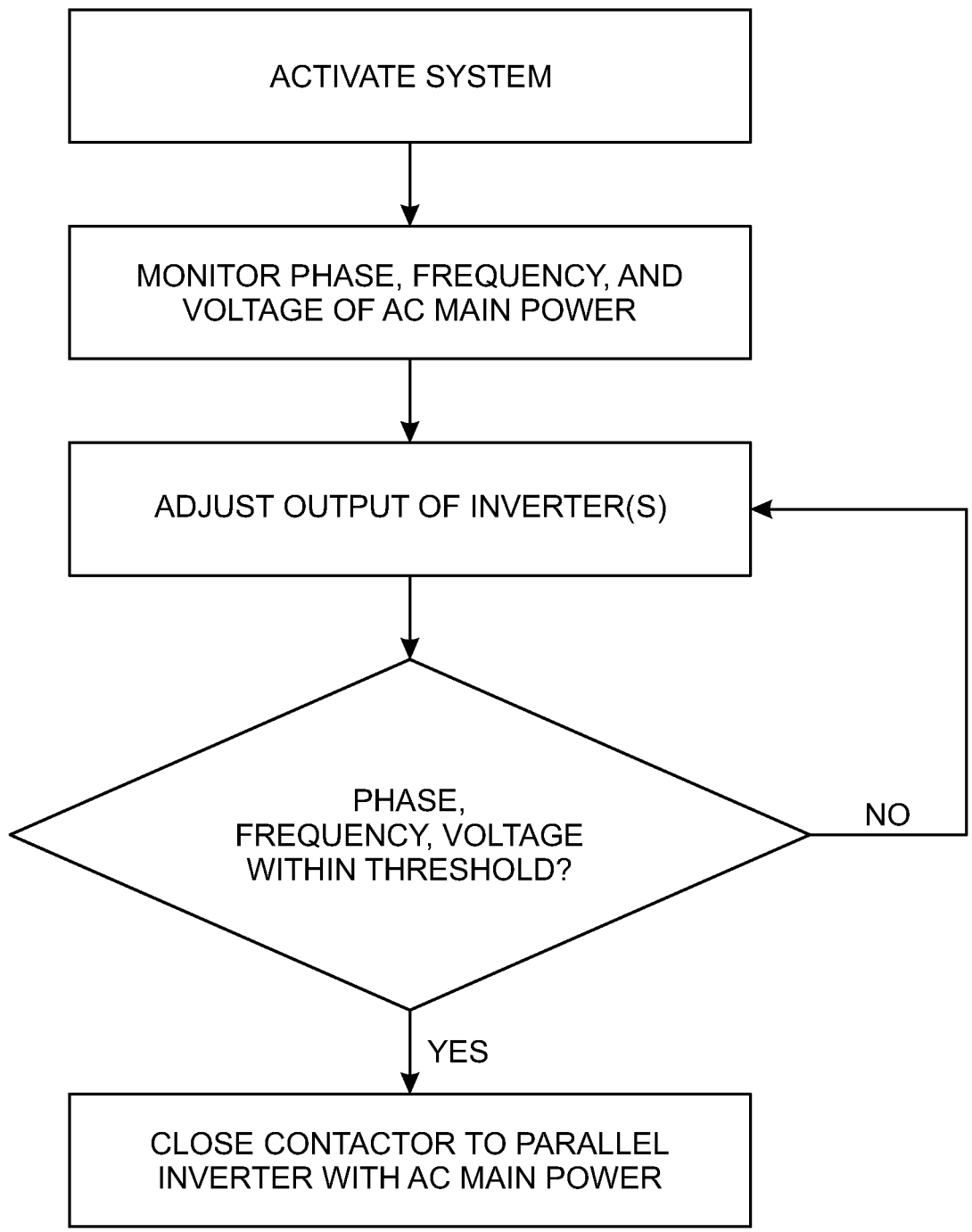
FIG. 6 is a simplified flow chart illustrating operation of an electrical power generating system in accordance with an example embodiment.
Figure 10:
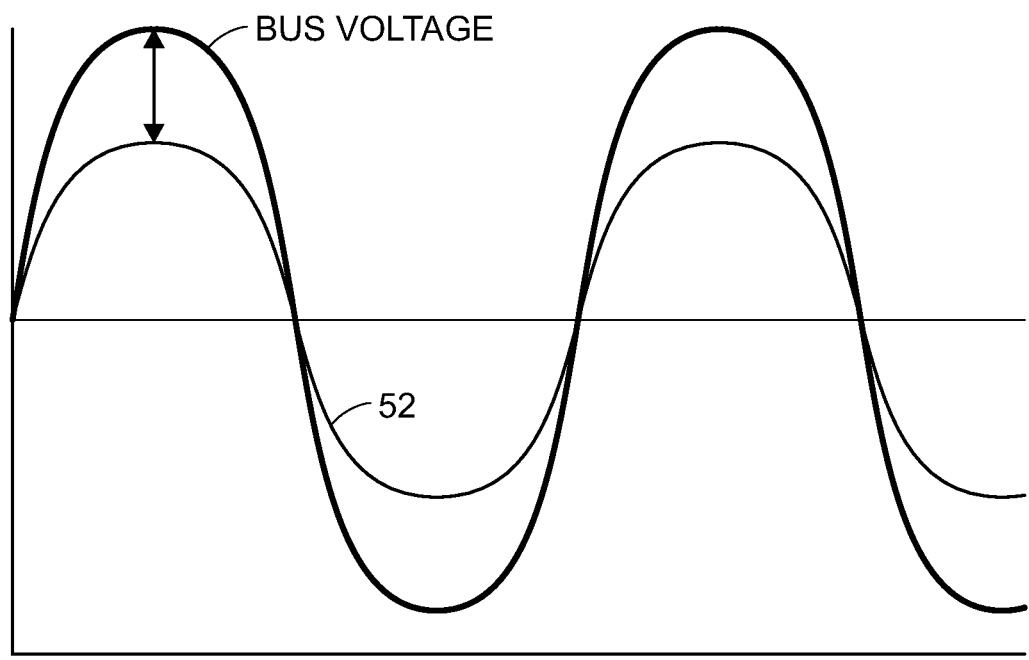
FIG. 10 illustrates voltage waveforms of an electrical power generating system in accordance with an example embodiment.
Figure 11:
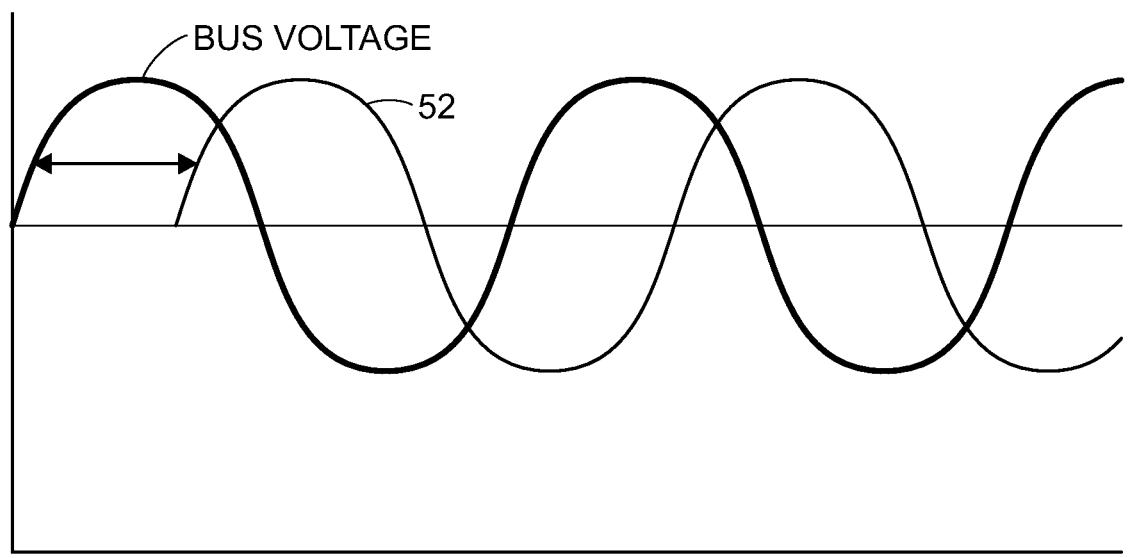
FIG. 11 is another illustration of voltage waveforms of an electrical power generating system in accordance with an example embodiment.
Figure 12:
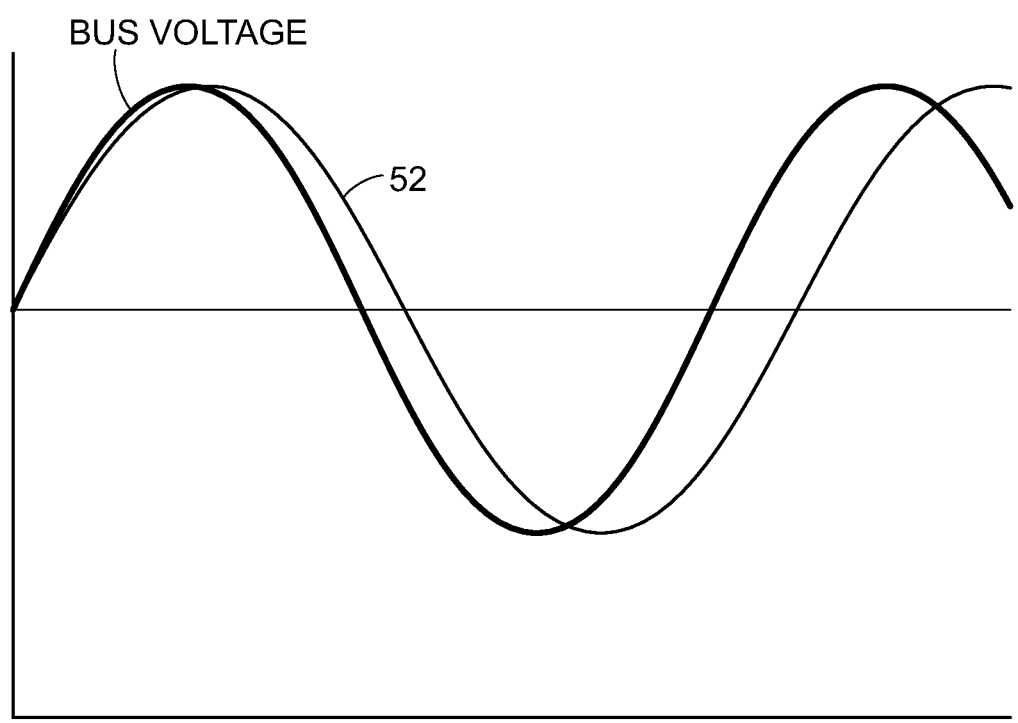
FIG. 12 is another illustration of voltage waveforms of an electrical power generating system in accordance with an example embodiment.

In use, the electrical power generating system 10 may be connected to existing building wiring as shown for example in FIGS. 1-3. To start using the system, as outlined generally in FIG. 6, a power button (not shown) may be pressed, which applies power to the controller 70, activating the system, which in turn automatically starts the fuel cell operation. Until the fuel cell is up and running normally (i.e., providing a DC output to the electrical storage unit 40 and the inverter 50) the electrical storage unit 40 can provide power to the system, including the controller 70. At this stage, by default, contactor 60 is deactivated. The controller then begins to monitor the phase, frequency, and voltage of the AC main power—that is, the voltage on the load bus 66, as well as those same parameters at the output of the inverter 50. Initially, there will be a difference in the parameters. For example, as shown in FIGS. 10, 11, and 12, there may be a difference in the voltage, the phase, and the frequency, respectively, between the bus voltage and the AC output 52 of the inverter 50. In the figures, these differences are indicated by the arrows.

The controller 70 will continue to monitor the voltages and adjust the output of the inverter 50 until the variable voltage parameters of the inverter 50 are within an acceptable threshold. This will allow contactor 60 to be closed, paralleling the two or more voltage sources without creating large transients on the load bus 66. For example, the frequency and the voltage may be matched to a close degree, such as within a few percent of each other. For phase, an acceptable threshold might be a phase difference of 5° or less, with the variable phase of the inverter voltage output 52 approaching, rather than moving away from, the phase of the voltage on the load bus 66. Other phase differences are also possible, and larger differences may be used, especially if the closing timing is performed by a circuit that detects zero crossings of the AC waveform to close the contactor 60 at or near zero crossings.

Once the AC output 52 is within acceptable limits, the controller 70 will send a command to contactor 60 to connect the electrical power generating system 10 to the AC load bus 66, paralleling the inverter output with AC main power. This operation is the same whether there is just one, or multiple, subsystems connected to provide power, as shown for example in FIGS. 1-3.

As mentioned above, the telemetry component 80, which may be in communication with controller 70 via link 74, also allows for remote monitoring and management of the system 10. It allows a user or users to monitor and control the system easily using a remote computing device 95, such as a smart phone, a tablet, a laptop, or a desktop computer, as just a few examples. In addition, the system 10 can be controlled and monitored by an external controller, such as utility control system 96, under the control of a utility company or other entity, to control the system 10. The system 10 may communicate with the remote computing device 95 via one or more communications or telemetry links 82. Parameters such as run time, remaining fuel amount, power output, output voltage, output current, operating temperature, etc., may be monitored via telemetry component 80, with the information presented graphically or in table form, for example, at device 95. The operating data may also be stored locally or in remote device 95 or utility control system 96 for reference later. In addition, remote computing device 95 or utility control system 96 may be used to control the system. Specifically, a user or entity may remotely initiate startup, shutdown, connection, or disconnection of the electrical power generating system 10 from the load bus 66. As mentioned above, the remote computing device 95 or utility control system 96 can communicate with the telemetry component of the electrical power generating system 10 via wired, wireless communications, or a combination of the two.

Figure 8:
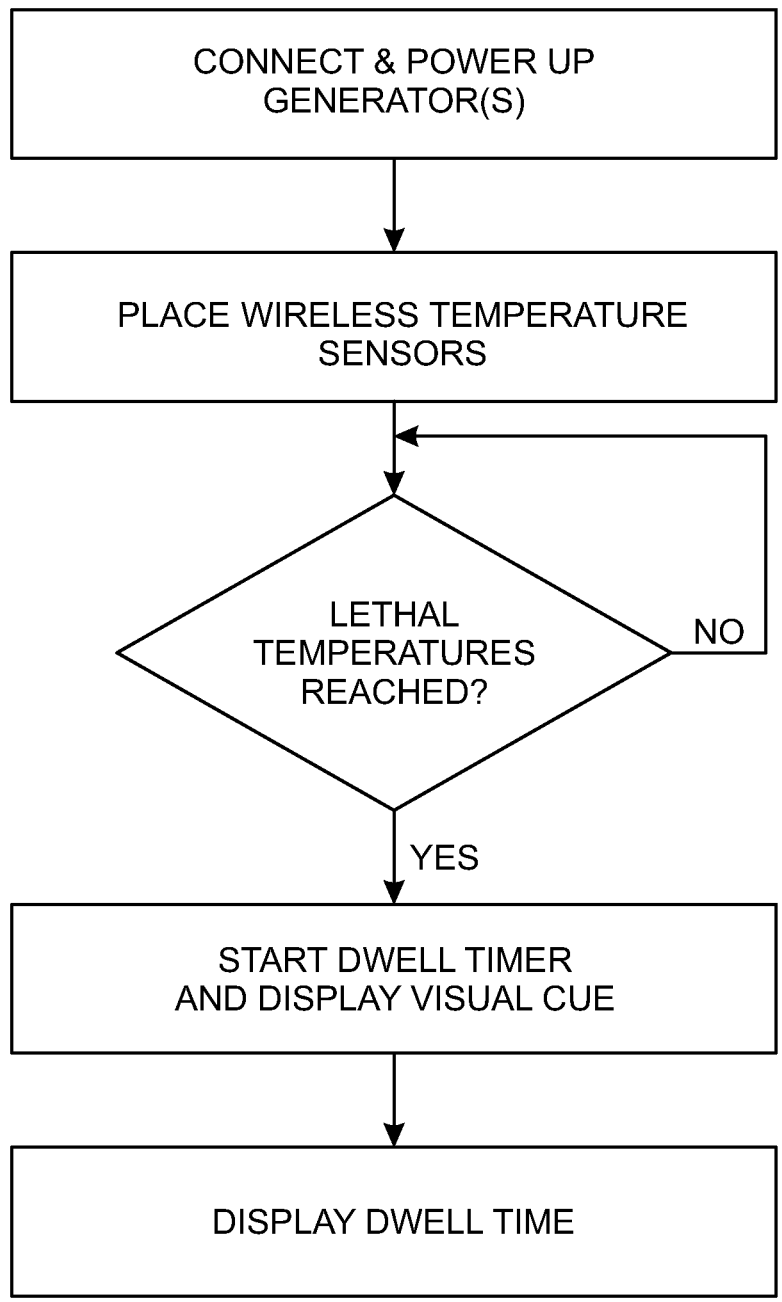
FIG. 8 is another simplified flow chart illustrating a use of an electrical power generating system in accordance with an example embodiment.
Figure 9:
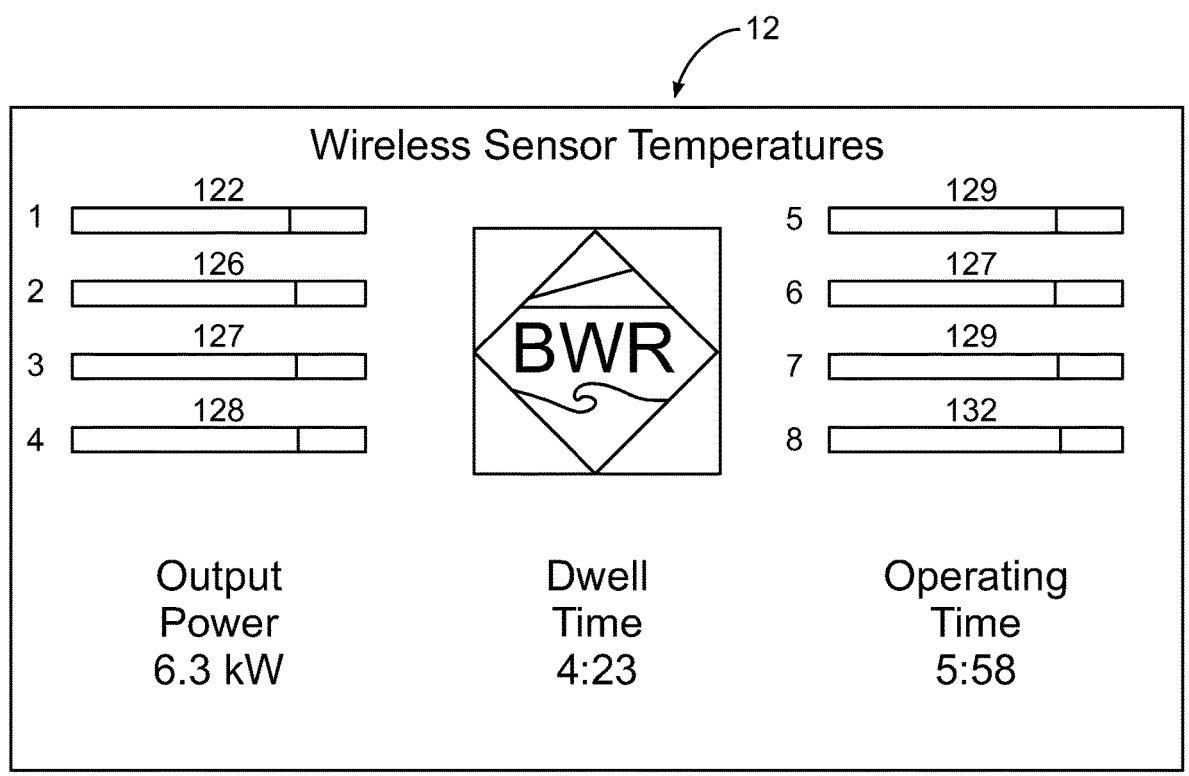
FIG. 9 is a front view of a display usable with an electrical power generating system in accordance with an example embodiment.

FIGS. 3, 8, and 9 represents a particular use of the system 10, which is to provide auxiliary power capacity to building wiring where a higher than normal load 92 is connected to the AC load bus 66. As shown in the figures generally, an entire system 10 is typically mounted on a single, portable unit 14, such that it can be easily moved into place, and will fit through doorways and hallways.

In the illustration, the load 92 is a high-powered (e.g., >6 kW) heater usable for pest remediation in hotel rooms or bedrooms. As shown in FIG. 3, the output of system 10 can be connected through ordinary power outlets in a room adjacent to the room with the extra load, in order to use the building wiring 66 as a micro-microgrid. On the load side, the load 92 is also simply plugged in to existing outlets in the room being treated, as shown. No special or additional connections are needed, although it may be noted that the building wiring system, without the addition power of electrical power generating system 10, may not be capable of continuously supplying the power needed at load 92. Note that the connections of FIG. 3 are exemplary of a particular use, although other uses, such as backup and emergency power generation, are also possible as explained herein. For pest remediation, the system 10 may have a custom display 12 to show system operating conditions during the remediation, as shown in FIG. 9.

In particular, for pest remediation using heat, it is required that a minimum temperature is reached and maintained to kill the pests. To ensure effective operation in this regard, the system 10 can receive, via wires or wirelessly, inputs from one or more temperature sensors 94 in the room to be treated. The electrical power generating system 10 can be configured to monitor and display the conditions on a display unit 12 during this process. The overall process is outlined in FIG. 8, and begins with connecting one or more electrical power generating systems 10 to the building wiring, as shown in FIG. 3.

Next, one or more temperature sensors, such as wireless sensors 94, may be placed in the room. As an example, they may be spaced apart to provide a good average temperature, and to ensure there are no cold spots-in other words, to ensure that every location in the room meets the temperature requirements for remediation. The system 10 will continue to monitor temperatures and provide power to the heater (load 92) until a minimum temperature, such as 125° F., is reached by every sensor 94.

Once lethal temperature is reached as indicated by all the temperature sensors 94, a dwell timer is started, and a visual cue is displayed along with the dwell time, on display 12. This allows a user to very easily see how long the lethal temperature has been applied to the room being treated, and to determine if remediation can be considered complete. Note that the parameters shown in FIG. 9 can also easily be displayed remotely on remote computing device 95. The display 12 may also display the output power level and the total system operating time, as also shown in FIG. 9.

The example embodiments, for example, as shown in FIGS. 13 and 14, can also be used to add onto the existing infrastructure of off-peak electrical grid management by allowing electrical utility control the externally-controllable electrical power generating system. In such case, the electrical generation system provides distributed generation of electrical power. The system can include a utility control system 96 to communicate with telemetry component 80 that manages the remotely located power source 100, such as a generator or a fuel cell, and an optional hydrogen generator or reformer (as shown, for example, in FIG. 1).

The potential use of a source of electricity other than the electricity provided by a utility is a worldwide issue. In developing countries, the electrical grid may be overtaxed or unreliable, and a means for backup generation provides reliable power to the point of use. In developed countries, the means for having distributed generation is important during times of excessive demand. The use of existing off-peak grid control allows for reduction of the electrical demand of individual users during peak demand. If the paradigm was shifted to provide additional supply, instead of reducing demand, the end user would able to use the appliances or power they wish, while the demand at the utility is not exceeded.

Perhaps most important is the ability for the example embodiments to provide electricity in times of emergency. This system 10 can be controlled at the utility level to provide point of use electricity for individual users when the supply of electricity from the utility is interrupted or limited. These instances may occur during floods, blizzards, hurricanes, earthquakes, and tornadoes-natural disasters that damage distribution infrastructure between utilities and customers. In certain cases, such as wildfires in California, utilities have selectively shut off electricity to customers to minimize the risks of electrical components of the distribution network from creating fires.

The example embodiment, as perhaps best shown in FIGS. 13 and 14, allows individual customers to have electricity available by local generation while the utility company can shut off the electricity flowing through the distribution network that may inadvertently cause wildfires, or that needs to be shut down for any other purpose. If a fuel cell is used, the output of the system can be safely managed externally, as there are no moving parts or dangerous heat sources. All electrical signals and connections can be managed and may be fully insulated to prevent accidental shocks or injury in the even a foreign object contacts any part of the generating system once it is installed. The utility control system 96 operated by the utility or other entity communicates with telemetry component 80, which provides reporting and control functionality both at the site of the installation or at a remote site via wired or wireless communication, or a combination of the two.

In some example embodiments, the generator controlled by this invention may be fueled by connection to an existing infrastructure supplying a fuel, such as a natural gas line or a connection to a propane source, generally denoted as fuel source 102. It is important to note that during times where the electrical grid may be interrupted, the natural gas line or propane line is not under the control of the utility company powering the electrical grid and is expected to be fully pressurized and operational.

Using the configuration of FIGS. 13 and 14, the system can add to the electrical grid by creating a local supply of electricity, as opposed to the implementation of off-peak management that shuts off selected electrical appliances and loads. The electricity produced by the exemplary embodiments may locally power the appliances (e.g., AC load 92) at the point of use, and may also provide electricity at the distribution level of the grid (e.g., AC Main 90), lowering the demand of the utility to provide electricity to the end user. The telemetry component 80 connects to an external controller, such as utility control system 96, for controlling a power source 100 (which may be a conventional generator with an inverter, for example, or a fuel cell and inverter) to provide AC power, which allows a utility company or other entity to optional engage or disengage the system.

The design of this system is inherently scalable and modular, allowing a system to be replicated and combined to create larger implementations. This scalability is seen at the hydrogen input level (where multiple fuel cells may be combined to create a larger electrical source or heat source. The system may also be scaled at the output of the fuel cells' direct current (DC) voltage output, where individual inverters may be implemented to create multiple AC circuits. Further, the system is also scalable at the outputs of inverter or inverters, where synchronizers that match voltage, frequency, and phase of alternating current (AC) outputs may be added to increase the availability of electricity produced at the point of use.

Unless otherwise defined, all technical and scientific terms used herein have the same meaning as commonly understood by one of ordinary skill in the art to which this invention belongs. Although methods and materials similar to or equivalent to those described herein can be used in the practice or testing of the electrical power generating system, suitable methods and materials are described above. All publications, patent applications, patents, and other references mentioned herein are incorporated by reference in their entirety to the extent allowed by applicable law and regulations. In the event of inconsistent usages between this document and those documents so incorporated by reference, the usage in the incorporated reference(s) should be considered supplementary to that of this document; for irreconcilable inconsistencies, the usage in this document controls. The electrical power generating system may be embodied in other specific forms without departing from the spirit or essential attributes thereof, and it is therefore desired that the present embodiment be considered in all respects as illustrative and not restrictive. Any headings utilized within the description are for convenience only and have no legal or limiting effect.

What is claimed is:

1. An externally-controllable electrical power generating system, comprising:
    a first power source comprising a first DC output;
    an electrical storage unit comprising a DC input coupled to the first DC output of the first power source, the electrical storage unit further comprising a second DC output;
    an inverter coupled to the second DC output of the electrical storage unit to receive power, the inverter comprising a first AC output;
    a contactor connected between the first AC output and an AC load bus, wherein the AC load bus has an AC voltage; and
    a controller adapted to sense a phase of the first AC output and the AC voltage of the AC load bus, wherein the controller controls the phase of the first AC output of the inverter;
    wherein the controller further comprises an output command to selectively activate the contactor when a relationship between the phase of the first AC output and the AC voltage are substantially matched;
    wherein the controller is further adapted to communicate with an external controller operated by a utility or a managing entity, such that the external controller can enable the controller to activate the output command.

2. The externally-controllable electrical power generating system of claim 1, wherein the controller is usable to adjust the phase of the first AC output of the inverter to cause it to substantially match the phase of the AC voltage on the AC load bus before the controller sends the output command.

3. The externally-controllable electrical power generating system of claim 1, wherein the external controller comprises a wireless device.

4. The externally-controllable electrical power generating system of claim 1, wherein the external controller is adapted to send a command to the controller to connect the externally-controllable electrical power generating system to the AC load bus.

5. The externally-controllable electrical power generating system of claim 1, wherein the external controller is adapted to allow a user to monitor operating conditions of the externally-controllable electrical power generating system.

6. The externally-controllable electrical power generating system of claim 1, wherein the external controller is adapted to send a command to the controller to disconnect the first AC output from the AC load bus.

7. The externally-controllable electrical power generating system of claim 1, wherein the external controller is adapted to send a command to the controller to shut down the externally-controllable electrical power generating system.

8. The externally-controllable electrical power generating system of claim 1, wherein activating the contactor causes the first AC output to be connected in parallel with the AC voltage on the AC load bus.

9. The externally-controllable electrical power generating system of claim 1, further comprising:
    a second power source comprising a third DC output;
    a second electrical storage unit comprising a second DC input coupled to the third DC output of the second power source, the second electrical storage unit further comprising a fourth DC output;
    a second inverter coupled to the fourth DC output of the second electrical storage unit to receive power, the second inverter comprising a second AC output;
    a second contactor connected between the second AC output and the AC load bus; and
    a second controller comprising second inputs adapted to sense a second phase of the second AC output and the AC voltage, wherein the second controller controls the second phase of the second AC output of the second inverter;
    wherein the second controller further comprises a second output command to selectively activate the second contactor when a relationship between the phase of the second AC output and the AC voltage are substantially matched.

10. A method of using the externally-controllable electrical power generating system of claim 1, comprising:
    activating the first power source;
    monitoring the phase of the AC voltage of the AC load bus;
    adjusting the phase of the first AC output to substantially match the phase of the AC voltage of the AC load bus; and
    activating the contactor to connect the first AC output to the AC load bus.

11. An externally-controllable electrical power generating system, comprising:
    a fuel cell comprising a first DC output;
    an electrical storage unit comprising a DC input coupled to the first DC output of the fuel cell, the electrical storage unit further comprising a second DC output;
    an inverter coupled to the second DC output of the electrical storage unit to receive power, the inverter comprising a first AC output;
    a contactor connected between the first AC output and an AC load bus, wherein the AC load bus has an AC voltage; and
    a controller adapted to sense a phase of the first AC output and the AC voltage, wherein the controller controls the phase of the first AC output of the inverter;
    wherein the controller further comprises an output command to selectively activate the contactor when a relationship between the phase of the first AC output and the AC voltage are substantially matched;
    wherein the controller is further adapted to communicate with an external controller operated by a utility or a managing entity, such that the external controller can enable the controller to activate the output command.

12. The externally-controllable electrical power generating system of claim 11, wherein the controller is usable to adjust the phase of the first AC output of the inverter to cause the phase of the first AC output of the inverter to substantially match the phase of the AC voltage on the AC load bus before the controller sends the output command.

13. The externally-controllable electrical power generating system of claim 11, wherein the external controller is adapted to send a command to the controller to connect the first AC output to the AC load bus.

14. The externally-controllable electrical power generating system of claim 11, wherein the external controller is adapted to allow a user to monitor operating conditions of the externally-controllable electrical power generating system.

15. The externally-controllable electrical power generating system of claim 11, wherein the external controller is adapted to send a command to the controller to disconnect the first AC output from the AC load bus.

16. A method of using the externally-controllable electrical power generating system of claim 11, comprising:
activating the fuel cell;
monitoring the phase of the AC voltage of the AC load bus;
adjusting the phase of the first AC output to substantially match the phase of the AC voltage of the AC load bus; and
activating the contactor to connect the first AC output to the AC load bus.

17. An externally-controllable electrical power generating system, comprising:
a fuel cell comprising a first DC output;
an electrical storage unit comprising a DC input coupled to the first DC output of the fuel cell, the electrical storage unit further comprising a second DC output;
an inverter coupled to the second DC output of the electrical storage unit to receive power, the inverter comprising a first AC output;
a contactor connected between the first AC output and an AC load bus, wherein the AC load bus has an AC voltage; and
a controller adapted to sense a phase of the first AC output and the AC voltage, wherein the controller controls the phase of the first AC output of the inverter;
wherein the controller further comprises an output command to selectively activate the contactor when a relationship between the phase of the first AC output and the AC voltage are substantially matched;
wherein the controller is further adapted to communicate with an external controller operated by a utility or a managing entity, such that the external controller can enable the controller to activate the output command.

18. The externally-controllable electrical power generating system of claim 17, wherein the controller is usable to adjust the phase of the first AC output of the inverter to cause it to substantially match the phase of the AC voltage on the AC load bus before the controller sends the output command.

19. The externally-controllable electrical power generating system of claim 17, wherein the external controller is adapted to allow a user to monitor operating conditions of the externally-controllable electrical power generating system.

20. The externally-controllable electrical power generating system of claim 17, wherein the external controller is adapted to send a command to the controller to disconnect the first AC output from the AC load bus.

\* \* \* \* \*